United States Patent
Kang et al.

(10) Patent No.: US 11,983,890 B2
(45) Date of Patent: May 14, 2024

(54) METHOD AND APPARATUS WITH MOTION INFORMATION ESTIMATION

(71) Applicant: SAMSUNG ELECTRONICS CO., LTD., Suwon-si (KR)

(72) Inventors: Chul Woo Kang, Suwon-si (KR); Hyun Cheol Jeon, Suwon-si (KR); Kyungboo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 16/916,669

(22) Filed: Jun. 30, 2020

(65) Prior Publication Data
US 2021/0174516 A1    Jun. 10, 2021

(30) Foreign Application Priority Data
Dec. 10, 2019    (KR) .................. 10-2019-0163932

(51) Int. Cl.
*G06T 7/246* (2017.01)
*G01C 21/16* (2006.01)
(Continued)

(52) U.S. Cl.
CPC ............ *G06T 7/246* (2017.01); *G01C 21/165* (2013.01); *G01C 21/28* (2013.01); *G06F 18/253* (2023.01);
(Continued)

(58) Field of Classification Search
CPC ........... G06T 7/246; G06T 2207/30252; G06T 2207/10016; G06T 2207/20081;
(Continued)

(56) References Cited

U.S. PATENT DOCUMENTS

| 6,052,647 A | 4/2000 | Parkinson et al. |
|---|---|---|
| 7,868,821 B2 | 1/2011 | Hoshizaki |

(Continued)

FOREIGN PATENT DOCUMENTS

| JP | 2009-198185 A | 9/2009 |
|---|---|---|
| KR | 10-0556104 B1 | 3/2006 |

(Continued)

*Primary Examiner* — Nasim N Nirjhar
(74) *Attorney, Agent, or Firm* — NSIP Law

(57) ABSTRACT

A processor-implemented motion information estimating method includes: estimating motion information based on at least one set of initial motion information of a vehicle that is obtained from at least one sensor; predicting a plurality of sets of image feature information corresponding to a periphery of the vehicle based on the estimated motion information; obtaining a plurality of sets of detected image feature information detected from an input image obtained from an image sensor and an accuracy of each of the sets of the detected image feature information using a neural network; evaluating a reliability of each of the sets of the detected image feature information by comparing the sets of the predicted image feature information and the sets of the detected image feature information; and correcting the estimated motion information based on at least one set of the sets of the detected image feature information selected based on a result of the evaluating of the reliability and on the accuracy.

26 Claims, 6 Drawing Sheets

(51) Int. Cl.

| | |
|---|---|
| *G01C 21/28* | (2006.01) |
| *G06F 18/25* | (2023.01) |
| *G06N 3/08* | (2023.01) |
| *G06V 10/44* | (2022.01) |
| *G06V 10/80* | (2022.01) |
| *G06V 10/82* | (2022.01) |
| *G06V 20/56* | (2022.01) |
| *G06V 20/58* | (2022.01) |

(52) U.S. Cl.
CPC .............. *G06N 3/08* (2013.01); *G06V 10/454* (2022.01); *G06V 10/806* (2022.01); *G06V 10/82* (2022.01); *G06V 20/584* (2022.01); *G06V 20/588* (2022.01); *G06T 2207/30252* (2013.01)

(58) Field of Classification Search
CPC ........ G06T 2207/20084; G01C 21/165; G01C 21/28; G06K 9/629; G06N 3/08; G06N 3/02; G06V 10/454; G06V 10/82; G06V 20/584; G06V 20/588; B60W 40/10; B60W 40/02; B60W 2050/009; B60W 2420/00; B60W 2520/10; B60W 2556/50; B60Y 2400/30
See application file for complete search history.

(56) References Cited

U.S. PATENT DOCUMENTS

| | | | |
|---|---|---|---|
| 8,676,498 | B2 | 3/2014 | Ma et al. |
| 2007/0222674 | A1* | 9/2007 | Tan ...................... G06Q 10/087 |
| | | | 342/357.32 |
| 2017/0045886 | A1 | 2/2017 | Liu et al. |
| 2017/0103275 | A1* | 4/2017 | Yamanoi .............. G06V 20/588 |
| 2018/0032802 | A1 | 2/2018 | Lee et al. |
| 2018/0045519 | A1 | 2/2018 | Ghadiok et al. |
| 2019/0138827 | A1* | 5/2019 | Uejima ..................... G06T 7/73 |
| 2020/0103894 | A1* | 4/2020 | Cella .................. G05B 23/0264 |
| 2020/0250890 | A1* | 8/2020 | Zhou ......................... G06T 7/55 |
| 2020/0410263 | A1* | 12/2020 | Gao ...................... G01S 17/931 |
| 2021/0342990 | A1* | 11/2021 | Huang ...................... G06T 7/11 |
| 2022/0269943 | A1* | 8/2022 | Szatmary ................. G06N 3/04 |

FOREIGN PATENT DOCUMENTS

| | | |
|---|---|---|
| KR | 10-2009-0056634 A | 6/2009 |
| KR | 10-1014070 B1 | 2/2011 |
| KR | 10-2011-0114218 A | 10/2011 |
| KR | 10-1183866 B1 | 9/2012 |
| KR | 10-1394546 B1 | 5/2014 |
| KR | 10-1470103 B1 | 12/2014 |
| KR | 10-2020-0044420 A | 4/2020 |

* cited by examiner

METHOD AND APPARATUS WITH MOTION INFORMATION ESTIMATION

CROSS-REFERENCE TO RELATED APPLICATIONS

This application claims the benefit under 35 USC § 119(a) of Korean Patent Application No. 10-2019-0163932 filed on Dec. 10, 2019, in the Korean Intellectual Property Office, the entire disclosure of which is incorporated herein by reference for all purposes.

BACKGROUND

1. Field

The following description relates to a method and apparatus with motion information estimation.

2. Description of Related Art

A vehicle navigation system may receive a radio wave from satellites included in global navigation satellite system (GNSS) when a moving object (for example, a vehicle) moves, and may verify a current position and a speed of the moving object. For example, the vehicle navigation system may calculate a three-dimensional (3D) current position of a vehicle that includes latitude, longitude, and elevation information using information received from a global positioning system (GPS) receiver. However, a GPS signal may include a GPS position error of approximately 10 meters (m) to 100 m.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented motion information estimating method includes: estimating motion information based on at least one set of initial motion information of a vehicle that is obtained from at least one sensor; predicting a plurality of sets of image feature information corresponding to a periphery of the vehicle based on the estimated motion information; obtaining a plurality of sets of detected image feature information detected from an input image obtained from an image sensor and an accuracy of each of the sets of the detected image feature information using a neural network; evaluating a reliability of each of the sets of the detected image feature information by comparing the sets of the predicted image feature information and the sets of the detected image feature information; and correcting the estimated motion information based on at least one set of the sets of the detected image feature information selected based on a result of the evaluating of the reliability and on the accuracy.

The correcting may include: selecting a fusion mode based on the result of the evaluating of the reliability and the accuracy; and correcting the estimated motion information based on at least one set of the detected image feature information corresponding to the selected fusion mode.

The fusion mode may include a predetermined number of axis position information and axis pose information to be derived from the at least one set of the detected feature information for the correcting of the estimated motion information.

The selecting of the fusion mode may include: selecting the fusion mode from a plurality of modes that uses the at least one set of the detected image feature information or the at least one set of the initial motion information for the correcting of the estimated motion information.

The selecting of the fusion mode may include: selecting the fusion mode from the modes based on a priority of each of the modes.

The selecting of the fusion mode further may include: in response to a priority of a fusion mode selected at a previous time being higher than a priority of a fusion mode to be selected at a current time, selecting the fusion mode for the current time after a time lag.

The comparing of the sets of the predicted image feature information and the sets of the detected image feature information may include: determining a difference between the sets of the predicted image feature information and the sets of the detected image feature information.

The difference between the sets of the predicted image feature information and the sets of the detected image feature information may include a difference between predicted object positions of the sets of the predicted image feature information and detected object positions of the sets of the detected image feature information.

The predicting may include: predicting the sets of the image feature information by converting the estimated motion information to a two-dimensional (2D) coordinate on a 2D image based on a field of view (FOV) of the image sensor.

The 2D image includes a 2D bird's-eye-view map image.

The correcting may include: converting a 2D coordinate of the selected at least one set of the detected image feature information to a dimension of the estimated motion information; and correcting the estimated motion information based on a result of the converting.

The estimating may include: determining a position, a speed, and a pose of the vehicle based on information received from an inertial measurement unit (IMU) sensor; obtaining a position from a global positioning system (GPS) sensor; obtaining a speed from a vehicle speedometer; and estimating the motion information by fusing sets of information obtained from the IMU sensor, the GPS sensor, and the vehicle speedometer.

The at least one set of the initial motion information may include any one of: the determined position, speed, and pose of the vehicle; the obtained position; and the obtained speed.

The method may include: determining whether to perform the motion information estimating method based on a speed obtained from a vehicle speedometer included in the initial motion information.

A non-transitory computer-readable storage medium may store instructions that, when executed by one or more processors, configure the one or more processors to perform the method.

In another general aspect, a motion information estimating apparatus includes: an image sensor configured to obtain an input image of a periphery of a vehicle; at least one non-image sensor configured to obtain at least one set of sensor information of a motion of the vehicle; and one or more processors configured to: determine at least one set of initial motion information of the vehicle based on the at least one set of the sensor information; estimate motion information based on the determined at least one set of the initial motion information; predict a plurality of sets of image feature information corresponding to the periphery of the vehicle based on the estimated motion information; obtain a plurality of sets of detected image feature information detected from the input image and an accuracy of each of the sets of the detected image feature information, using a neural network; evaluate a reliability of each of the sets of the detected image feature information by comparing the sets of the predicted image feature information and the sets of the detected image feature information; and correct the estimated motion information based on at least one set of the sets of the detected image feature information selected based on a result of the evaluating of the reliability and on the accuracy.

For the correcting, the one or more processors may be configured to: select a fusion mode based on the result of the evaluating of the reliability and the accuracy; and correct the estimated motion information based on at least one set of the detected image feature information corresponding to the selected fusion mode.

For the selecting of the fusion mode, the one or more processors may be configured to: select the fusion mode from a plurality of modes that uses the at least one set of the detected image feature information or the at least one set of the initial motion information for the correcting of the estimated motion information.

For the selecting of the fusion mode, the one or more processors may be configured to: select the fusion mode from the modes based on a priority of each of the modes.

For the selecting of the fusion mode, the one or more processors may be configured to: in response to a priority of a fusion mode selected at a previous time being higher than a priority of a fusion mode to be selected at a current time, select the fusion mode for the current time after a time lag.

For the comparing of the sets of the predicted image feature information and the sets of the detected image feature information, the one or more processors may be configured to: determine a difference between the sets of the predicted image feature information and the sets of the detected image feature information.

For the predicting, the one or more processors may be configured to: predict the sets of the image feature information by converting the estimated motion information to a two-dimensional (2D) coordinate on a 2D image based on a field of view (FOV) of the image sensor.

For the correcting, the one or more processors may be configured to: convert a 2D coordinate of the selected at least one set of the detected image feature information to a dimension of the estimated motion information; and correct the estimated motion information based on a result of the converting.

For the estimating, the one or more processors may be configured to: determine a position, a speed, and a pose of the vehicle based on information received from an inertial measurement unit (IMU) sensor; obtain a position from a global positioning system (GPS) sensor; obtain a speed from a vehicle speedometer; and estimate the motion information by fusing sets of information obtained from the IMU sensor, the GPS sensor, and the vehicle speedometer.

The apparatus may include a memory storing instructions that, when executed by the one or more processors, configure the one or more processors to perform the estimating of the motion information, the predicting of the sets of the image feature information, the determining of the sets of detected image feature information, the evaluating of the reliability of each of the sets of the detected image feature information, and the correcting of the estimated motion information.

In another general aspect, a processor-implemented motion information estimating method includes: estimating motion information of a vehicle based on information received from at least one sensor; predicting image feature information corresponding to a periphery of the vehicle based on the estimated motion information; detecting, using a neural network, image feature information based on an input image obtained from at least one other sensor; determining a reliability of the detected image feature information by comparing the predicted image feature information with the detected image feature information; and correcting the estimated motion information based on the detected image feature information, in response to the determined reliability being greater than or equal to a threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
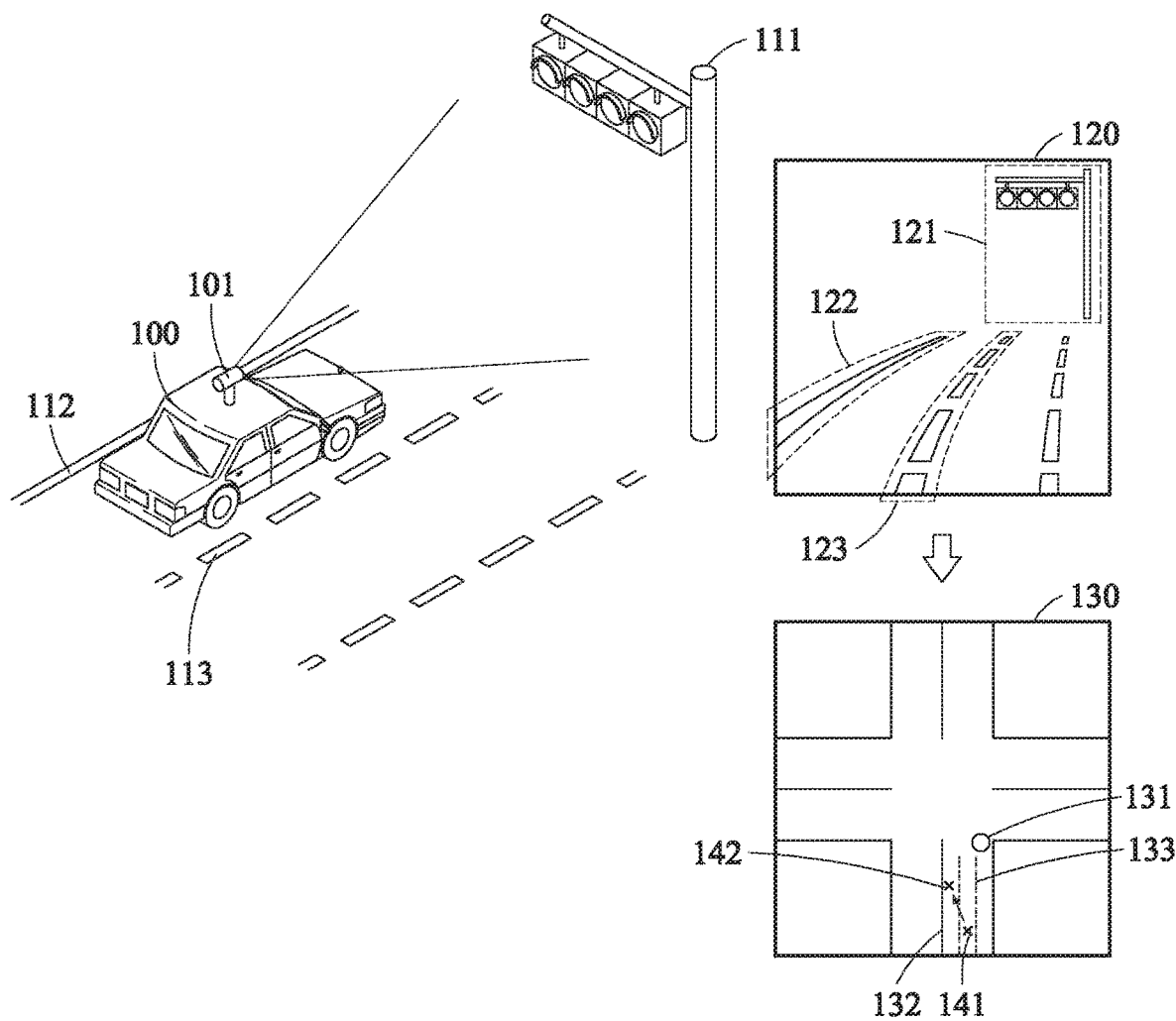
FIG. 1 illustrates an example of a situation in which a position of a vehicle is estimated.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an,"

and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a situation in which a position of a vehicle is estimated.

In an example, an apparatus for estimating motion information of a vehicle, hereinafter simply referred to as a motion information estimating apparatus, may estimate a position of the vehicle using sensor information of an image sensor and a non-image sensor. The motion information estimating apparatus may correct a position of the vehicle that is estimated using the sensor information of the non-image sensor by using the sensor information of the image sensor. For example, the motion information estimating apparatus may fuse sensor information of an inertial sensor and the sensor information of the image sensor. By fusing sets of sensor information of different types of sensors as described above, the motion information estimating apparatus of one or more embodiments may estimate a position of the vehicle more precisely than, and solve a technological problem of, a typical motion information estimating apparatus that estimates the position of the vehicle less accurately by using sensor information of a single type of sensor and/or without fusing of sensor information of different types of sensors as described above and as will be further described herein.

The motion information estimating apparatus may selectively fuse the sensor information of the image sensor and the sensor information of the non-image sensor based on a reliability and/or an accuracy. The motion information estimating apparatus may selectively fuse sets of feature information that are detected from the image sensor and sets of motion information that are obtained from the non-image sensor based on the reliability and/or the accuracy. The motion information estimating apparatus may select sets of information to be used to obtain final motion information, and increase a reliability of the final motion information.

The motion information estimating apparatus may select sets of information to be used to be fused by selecting a fusion mode from a plurality of modes that selectively include the feature information detected from the image sensor and the motion information obtained from the non-image sensor based on the reliability and/or the accuracy. Here, each of the modes may have a priority based on a precision. For example, the motion information estimating apparatus may provide a precise multi-mode motion information estimating method based on a fusion of the inertial sensor and the image sensor. Thus, the motion information estimating apparatus may obtain more accurate final motion information by selecting the fusion mode based on the priority.

For example, when a priority of a fusion mode selected at a current time is higher than a priority of a fusion mode selected at a previous time, the motion information estimating apparatus may obtain motion information immediately using the fusion mode selected at the current time. Through this, the motion information estimating apparatus may increase an accuracy of final motion information by immediately applying a fusion mode with a higher precision to the current time. In contrast, when the priority of the fusion mode selected at the current time is lower than the priority of the fusion mode selected at the previous time, the motion information estimating apparatus may obtain motion information using a fusion mode selected at the current time after a certain time interval. Through this, the motion information estimating apparatus may maintain motion information of the previous time that may be more accurate for a certain amount of time, and may thus prevent a decrease in an accuracy of motion information of the current time that may occur due to a mode with a relatively lower precision.

The motion information estimating apparatus may also be applied to the estimation of motion information of an aircraft in addition to the estimation of motion information of a vehicle. The motion information estimating apparatus may be applied to autonomous driving and vehicle control systems such as, for example, advanced driver-assistance systems (ADAS), in addition to existing vehicle positioning. The motion information estimating apparatus may provide a solution for a positioning system for which a desired precision is required to implement autonomous driving or augmented reality (AR) in a vehicle.

The motion information estimating apparatus of one or more embodiments may be a heterogeneous sensor fusion system configured to precisely estimate a position. For example, the motion information estimating apparatus may fuse an image sensor and an inertial sensor in either one or both of two ways. In a first way, the motion information estimating apparatus may estimate a relative position, for example, simultaneous localization and mapping (SLAM) or visual odometry (VO). In a second way, the motion information estimating apparatus may estimate an absolute position using a landmark on map information. The motion information estimating apparatus may estimate the absolute position, but is not limited thereto. The motion information estimating apparatus may estimate a position by estimating both the relative position and the absolute position.

The motion information estimating apparatus of one or more embodiments may estimate motion information that is more reliable and more accurate than typical motion information that is estimated using only individual sensors. For example, compared to a typical motion information estimating apparatus estimating motion information through a fusion of a global navigation satellite system (GNSS) and an inertial measurement unit (IMU), the motion information estimating apparatus of one or more embodiments may achieve a higher precision than the GNSS of the typical motion information estimating apparatus and may reduce issues of the accumulation of errors in integration that may occur by using the IMU of the typical motion information estimating apparatus.

In a typical image-based positioning technology using only an image without using sensor fusion, which is a positioning technology based on landmark detection and map information matching, mismatches may occur frequently, and thus an unstable result may be obtained. Compared to such typical method of detecting feature information simply using an image sensor, the motion information estimating apparatus of one or more embodiments may reduce reliability-related issues due to errors that may occur nonlinearly in the image sensor.

In a typical method of combining sensor information of an image sensor and sensor information of an inertial sensor and temporally correcting motion information based on an error of an existing position, speed, and pose of a vehicle using a Kalman filter, the typical method may not guarantee a desired performance due to a nonlinear error of an image itself. Compared to such typical method of simply correcting an error of information of the image sensor based on motion information of a previous time that is obtained from the sensor information of the inertial sensor using the Kalman filter, the motion information estimating apparatus of one or more embodiments may achieve a higher reliability by detecting various sets of feature information in a same image and selecting information suitable for a situation. The motion information estimating apparatus of one or more embodiments may achieve a higher reliability by selectively accepting motion information and/or feature information based on a determined reliability thereof.

To achieve these, the motion information estimating apparatus may include an image sensor and a non-image sensor. The image sensor may include a camera configured to capture an image of an outside. The non-image sensor may include an IMU configured to measure an angular speed and an acceleration, and a global positioning system (GPS) configured to measure a position, a speed, and a pose. The non-image sensor may further include a radio detection and ranging (radar) sensor and a light detection and ranging (lidar) sensor. The radar sensor and the lidar sensor may have a spatial resolution, and may thus be included in the image sensor.

The motion information estimating apparatus may determine whether to perform the estimation of motion information using image information based on a speed measured by a vehicle speedometer. The vehicle speedometer may include, for example, an on-board diagnostics (OBD) sensor. For example, when the speed is 0, the motion information estimating apparatus may determine a stop state, or a stationary state, and perform zero-velocity update (ZUPT). In the stationary state, sensor information may include noise. For example, although sensor information of an IMU sensor indicates a speed of 1 kilometer per hour (1 km/h), the motion information estimating apparatus may substantially or actually indicate the stationary state and it may thus be possible to easily identify noise of the IMU sensor. In this example, the motion information estimating apparatus may disregard sensor information to be received from a sensor (e.g., the IMU sensor), and may update motion information of a current time based on motion information estimated at a previous time. Thus, the motion information estimating apparatus may suspend performing an unnecessary operation in such a stationary state, and may thus save computing resources.

The motion information estimating apparatus may first estimate motion information from non-image sensors. For example, the motion information estimating apparatus may collect asynchronous sensor information from a GPS sensor, an IMU sensor, and/or an OBD sensor. In this example, sensor information of the IMU sensor may be updated using an inertial navigation system (INS). The motion information estimating apparatus may calculate motion information by calculating a position, a speed, and a pose through the INS, and by calculating position information from sensor information of the GPS sensor. Herein, the motion information calculated as described in the foregoing may be referred to herein as initial motion information.

The motion information estimating apparatus may fuse sets of the initial motion information obtained from respective sensors to first estimate motion information of a vehicle at a current time. The motion information estimated as described in the foregoing may be referred to herein as estimated motion information. The estimated motion information may be information in a three-dimensional (3D) space.

The motion information estimating apparatus may convert the 3D estimated motion information to two-dimensional (2D) information. In an example, the motion information estimating apparatus may obtain 2D feature information by converting a 3D coordinate of feature information included in map information to a 2D coordinate based on a field of view (FOV) of the image sensor. Such 2D feature information obtained by the converting may be referred to herein as predicted image feature information. For example, the motion information estimating apparatus may extract candidate landmarks around an estimated position. The motion information estimating apparatus may convert a candidate landmark having a 3D coordinate to a 2D coordinate corresponding to a camera frame based on a currently estimated position and pose of the estimated motion information. The motion information estimating apparatus may predict a landmark that is to be included or shown in the FOV of the image sensor among candidate landmarks extracted from map information. Thus, the motion information estimating apparatus may predict a landmark that is to be included or shown in the FOV of the image sensor configured to obtain image data among landmarks of the map information based on an estimated position and pose of a target of the estimated motion information. The motion information estimating apparatus may predict a position and a pose of a vehicle at an upcoming future time based on motion information of the vehicle. Based on such predicted values, the motion information estimating apparatus may predict information that is to be shown in the image sensor. The motion information estimating apparatus may immediately match a predicted position and pose onto a map without directly using image-based predicted values.

The motion information estimating apparatus may perform preprocessing on an image obtained from the image sensor. Through the preprocessing, the motion information estimating apparatus may process the image to be in a form suitable for an input to a neural network.

The motion information estimating apparatus may detect feature information from an image. The motion information estimating apparatus may obtain the image using the image sensor. The motion information estimating apparatus may detect sets of feature information indicated in map information from the image using an image processing algorithm. For example, the motion information estimating apparatus may detect a plurality of sets of feature information from a single image using various image processing methods. In this example, the image processing methods may include a deep neural network (DNN)-based method and a traditional CV algorithm. For example, the motion information estimating apparatus may detect, from a single image, respective sets of feature information using a neural network configured to detect landmarks (for example, a traffic light and/or a traffic sign), a neural network configured to detect a lane, a neural network configured to identify a line, and/or a neural network configured to identify any combination of the landmarks, the lane, and the line. In this example, the neural networks may be trained in advance with a great amount of training data. However, a neural network may not be respectively set based on each type of feature information unlike the example described in the foregoing, and a neural network that may detect a plurality of sets of feature information at once may be used.

Here, the term feature information or image feature information may indicate an object that is fixed at a geographical position to provide a driver with information needed for a vehicle to travel on a road. The feature information may include, for example, a landmark, a lane marking, and/or a lane number. For example, the feature information may include a road sign, a traffic light, and the like. The landmark may be classified into, for example, a caution mark, a regulation mark, an indication mark, an auxiliary mark, a road mark, a signal, and the like. However, the classification of the landmark for each class is not limited to the foregoing examples.

The feature information may include the landmark, the lane marking, and the lane number as described above, but is not limited thereto. For example, information that may help verify motion information of a vehicle from an image may also be included in the feature information. The landmark may also be referred to herein as a feature or an object. The lane marking may also be referred to herein as a lane. In addition, the lane number may also be referred to herein as the number of a lane, and may be identified as a first lane, a second lane, and the like, for example.

When each set of feature information is separately detected, a certain set of feature information may not be detected in a single image, or feature information that is erroneous or incorrect may be detected, or erroneous or incorrect information may be generated in a map information matching process although the detection is accurately performed. In such a case, the motion information estimating apparatus may improve robustness against such errors that may occur in an image processing process by selecting a motion based on a reliability or accuracy of each set of information.

For example, a reliability of sensor information of a current sensor may be determined using sensor information of another sensor. The motion information estimating apparatus may perform mutual fault detection using different types of sensor data. For example, the reliability may be determined through a residual-based mutual verification method.

For example, an accuracy of sensor information of a current sensor may be determined itself by the sensor information of the current sensor without using sensor information of another sensor. For example, an accuracy of sensor information of a GPS sensor may be derived from the number of visible satellites used, and an accuracy of feature information detected from an image may be derived from self-validation or self-evaluation using a neural network.

The motion information estimating apparatus may select a mode from a plurality of modes each having a priority that is set based on a precision. Here, the term precision may indicate a level of precision in motion information to be obtained or derived from sensor information. For example, when an A sensor identifies a position with an error of 10 meters (m) and a B sensor identifies a position with an error of 1 m, the motion information estimating apparatus may determine that a precision of the B sensor is higher than a precision of the A sensor.

Here, the motion information estimating apparatus may select the mode based on a determined reliability or a determined accuracy of the mode. The motion information estimating apparatus may perform fault detection based on a difference between a position of a candidate landmark and an actually detected position of the landmark. For example, the motion information estimating apparatus may calculate a reliability based on a difference between a predicted position and a detected position. In this example, when the calculated reliability is less than a threshold value, the motion information estimating apparatus may determine that there is a malfunction in an image processing process on feature information detected from the image sensor. The motion information estimating apparatus may distinguish a case in which an erroneous or incorrect result is calculated due to such a malfunction, and a case in which a result is not calculated and there are no measurements. The motion information estimating apparatus may select a corresponding mode based on whether there is a measurement, of a measured value, or not.

For example, there may be a first case in which a landmark in front may be detected, a second case in which only a lane marking may be reliably or accurately detected because a reliability or an accuracy of the landmark is low, a third case in which only a lane number may be reliably or accurately detected because respective reliabilities or accuracies of the landmark and the lane marking are low, a fourth case in which sensor information of an image sensor is not available due to the degradation of a reliability or an accuracy but a GPS sensor operates normally or with determined sufficient reliability, and a fifth case in which both the image sensor and the GPS sensor are not available. Such cases are provided as examples, and there may be more various situations.

For each of such various cases and situations, a corresponding mode may be set. In the foregoing example, a first mode corresponding to the first case may be a mode in which the landmark in feature information of the image sensor is used. In the first mode, six-dimensional (6D) information to be derived from the landmark may be used. The 6D information may include three-axis position information and three-axis pose information. In addition, a second mode corresponding to the second case may be a mode in which the lane marking in the feature information of the image sensor and the GPS sensor are used. In the second mode, two-axis position information in a lateral direction and an elevation direction and three-axis pose information that are derived from the lane marking, and previous and current position information that is derived from the GPS sensor may be used. In addition, a third mode corresponding to the third case may be a mode in which the lane number in the feature information of the image sensor and the GPS sensor are used. In the third mode, two-axis position information in a lateral direction and an elevation direction may be used. Here, a position adjustment in a lateral direction relative to a center of a lane corresponding to the lane number may be performed. In addition, a fourth mode corresponding to the fourth case based on the estimation based on the GPS sensor in a front direction may be a mode in which an INS and the GPS sensor are used. In addition, a fifth mode corresponding to the fifth case may be a mode in which only the INS is used.

The modes may have respective priorities that are set based on the precision. For example, the precision may be lowered from the first mode to the fifth mode (e.g., wherein the precision of the first mode is greatest and the precision of the fifth mode is smallest among the modes). In this example, a switch from an upper mode to a lower mode may be performed with a certain time interval therebetween. The time interval may be referred to herein as hysteresis or a time lag. Through this, the motion information estimating apparatus may prevent a degradation of the precision that may occur when the switch from the upper mode to the lower mode is performed rapidly. In contrast, in a case of a switch from the lower mode to the upper mode, there may be no degradation of the precision and it may thus be performed immediately (e.g., performed without the certain time interval therebetween).

The motion information estimating apparatus may correct the estimated motion information using information included in a selected mode. The motion information estimating apparatus may convert a dimension of the information included in the selected mode to a dimension of the estimated motion information. For example, the motion information estimating apparatus may convert the information included in the selected mode from 2D to 3D.

The motion information estimating apparatus may calculate a current position by combining results of processing information of a GPS sensor, an IMU, an OBD sensor (e.g., of the estimated motion information), and results of processing information of an image sensor (e.g., of selected detected image feature information). For example, the motion information estimating apparatus may combine different types of information using a nonlinear filter such as, for example, a multi-model Kalman filter, an extended Kalman filter, an unscented Kalman filter, a cubature Kalman filter, a particle filter, and the like. As described above, the motion information estimating apparatus may obtain more accurate motion information by fusing sensor information of the GPS sensor, the IMU, the OBD sensor, and/or the image sensor.

Referring to FIG. 1, a vehicle 100 may include an image sensor 101 and a heterogeneous sensor. The heterogeneous sensor may include a a global positioning system (GPS), an inertial measurement unit (IMU), and/or an on-board diagnostics (OBD), for example. A motion information estimating apparatus provided in the vehicle 100 may calculate initial motion information based on sensor information of each of the GPS, the IMU, and the OBD. The motion information estimating apparatus may estimate motion information that is more accurate than the initial motion information based on the initial motion information. For example, as illustrated, a position of the vehicle 100 may be estimated to be a position 141 on a map 130.

The image sensor 101 may capture an image 120 of a front side of the vehicle 100. The captured image 120 includes a traffic light 121, a lane marking 122, and a lane marking 123 as illustrated. The motion information estimating apparatus may detect the traffic light 121 from the image 120 using a neural network configured to detect landmarks, may detect the lane markings 122 and 123 from the image 120 using a neural network configured to detect lane markings, and/or may detect may detect the traffic light 121 and the lane markings 122 and 123 from the image 120 using a neural network configured to detect landmarks and lane markings.

The motion information estimating apparatus may predict a position of each of a traffic light 111, a lane marking 112, and a lane marking 113 based on estimated motion information and map information. In an example, a difference between a predicted position of the traffic light 111 and a detected position of the traffic light 121 may be greater than a threshold value, a difference between a predicted position of the lane marking 112 and a detected position of the lane marking 122 may be less than or equal to the threshold value, and a difference between a predicted position of the lane marking 113 and a detected position of the lane marking 123 may be less than or equal to the threshold value. In an example, the motion information estimating apparatus may determine a mismatch of the traffic light 111 and the traffic light 121 and/or that the traffic light 121 is detected at an erroneous position, when the difference between the predicted position of the traffic light 111 and the detected position of the traffic light 121 is greater than the threshold value. When the mismatch is determined, the motion information estimating apparatus may select a fusion mode using position information 132 of the lane marking 122 and position information 133 of the lane marking 123 and excluding use of position information 131 of the traffic light 121, even though information obtained from the traffic light 121 may generally be more precise than information obtained from the lane markings 122 and 123.

The motion information estimating apparatus may correct the estimated motion information using the position information 132 of the lane marking 122 and the position information 133 of the lane marking 123. The motion information estimating apparatus may correct a position of the vehicle 100 from the estimated position 141 on the map 130 to a position 142 on the map 130. The motion information estimating apparatus may not use a measurement calculated from the traffic light 111 for the correcting of the position, but use only measurements calculated from the lane markings 112 and 113 (e.g., when the difference between the position of the traffic light 111 and the position of the traffic light 121 is greater than the threshold value, the difference between the position of the lane marking 112 and the position of the lane marking 122 is less than or equal to the threshold value, and the difference between the position of the lane marking 113 and the position of the lane marking 123 is less than or equal to the threshold value). In an example, the motion information estimating apparatus may use position information of a landmark or lane marking to correct estimated motion information when a difference between a predicted position and detected position of the landmark or lane marking is less than or equal to a threshold, and may exclude use of the position information to correct the estimated motion information when the difference is greater than the threshold. As described above, although information of lane markings may provide information only about a side direction of a vehicle, reliability thereof may be relatively high, and thus the motion information estimating apparatus may achieve a satisfying balance between a reliability and a precision.

Figure 2:
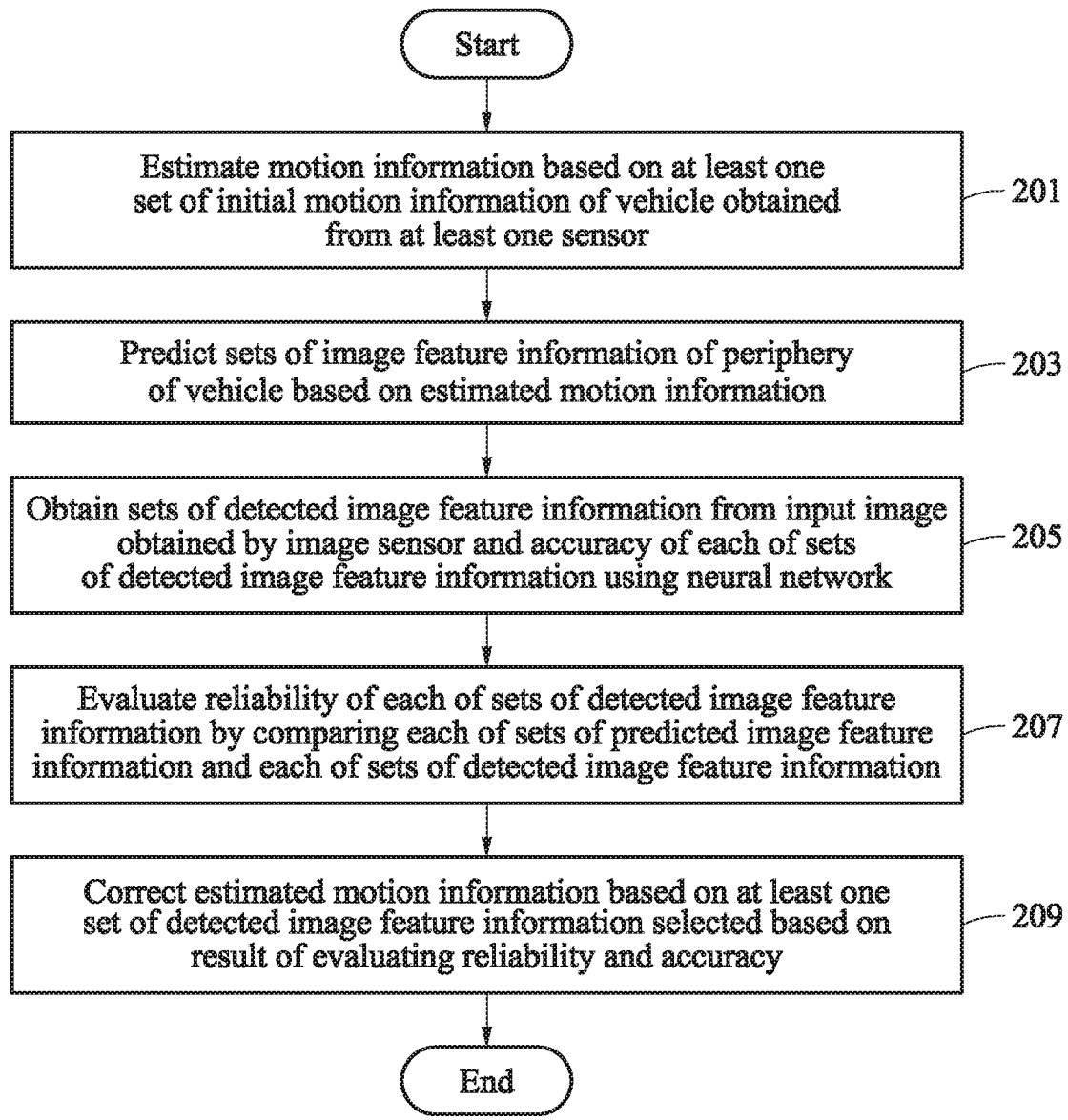
FIG. 2 illustrates an example of a motion information estimating method.

FIG. 2 illustrates an example of a motion information estimating method.

A motion information estimating apparatus may selectively perform a zero-velocity update (ZUPT) test. The motion information estimating apparatus may determine whether to perform a motion information estimating method based on a speed obtained from a vehicle speedometer. The motion information estimating apparatus may disregard sensor information received from a sensor for a current time, and update motion information at a current time based on or to be motion information estimated at a previous time (e.g., when a difference between the sensor information received for the current time and sensor information received for a previous time is less than or equal to a threshold value).

Referring to FIG. 2, in operation 201, the motion information estimating apparatus may estimate motion information based on at least one set of initial motion information of a vehicle that is obtained from at least one sensor. For example, the motion information estimating apparatus may estimate, as the initial motion information, any one or any combination of a position, a speed, and/or a pose of the vehicle calculated from an IMU sensor; a position obtained from a GPS sensor; and a speed determined from a vehicle speedometer.

The motion information estimating apparatus may estimate the motion information by fusing sets of the estimated initial information estimated from the plurality of sensors. The motion information estimating apparatus may first estimate motion information of the vehicle at a current time by fusing the sets of the initial motion information obtained from the sensors.

In operation 203, the motion information estimating apparatus may predict a plurality of sets of image feature information associated with a periphery of the vehicle based on the estimated motion information. The motion information estimating apparatus may predict the sets of the image feature information by converting the estimated motion information to a 2D coordinate on an image based on a FOV of an image sensor. For example, the motion information estimating apparatus may extract candidate landmarks around an estimated position. In this example, the motion information estimating apparatus may convert a candidate landmark having a 3D coordinate to a 2D coordinate corresponding to a camera frame based on a currently estimated position and pose of the estimated motion information.

In operation 205, the motion information estimating apparatus may obtain a plurality of sets of detected image feature information from the image sensor and obtain an accuracy of each of the sets of the detected image feature information, using a neural network. The motion information estimating apparatus may obtain an accuracy of feature information detected from an image through self-evaluation using the neural network.

In operation 207, the motion information estimating apparatus may evaluate a reliability of each of the sets of the detected image feature information by comparing each of the sets of the predicted image feature information and each of the sets of the detected image feature information. The motion information estimating apparatus may evaluate the reliability based on a difference between the sets of the predicted image feature information and the sets of the detected image feature information. For example, the motion information estimating apparatus may calculate a reliability based on a difference between a predicted position (e.g., of the predicted image feature information) and a detected position (e.g., of the detected image feature information). In this example, when the calculated reliability is less than or equal to a threshold value, the motion information estimating apparatus may determine that a malfunction occurs in an image processing process on feature information detected from the image sensor and/or that the detected position is to be excluded from an operation of correcting the estimated motion information (e.g., operation 209).

In operation 209, the motion information estimating apparatus may correct the estimated motion information based on at least one set of the detected image feature information selected from the sets of the detected image feature information based on a result of evaluating the reliability and the accuracy. The motion information estimating apparatus may select the set of the detected image feature information to be used for the correction by excluding feature information from which a malfunction is determined or no measurements are determined. In an example, the motion information estimating apparatus may select the set of the detected image feature information to be used for the correction by excluding sets of the detected image feature information having calculated reliabilities less than or equal to the threshold value and/or by selecting one or more sets of the detected image feature information having calculated reliabilities greater than the threshold value. Based on the set of the detected image feature information to be used for the correction, a plurality of modes may be set in advance.

Figure 3:
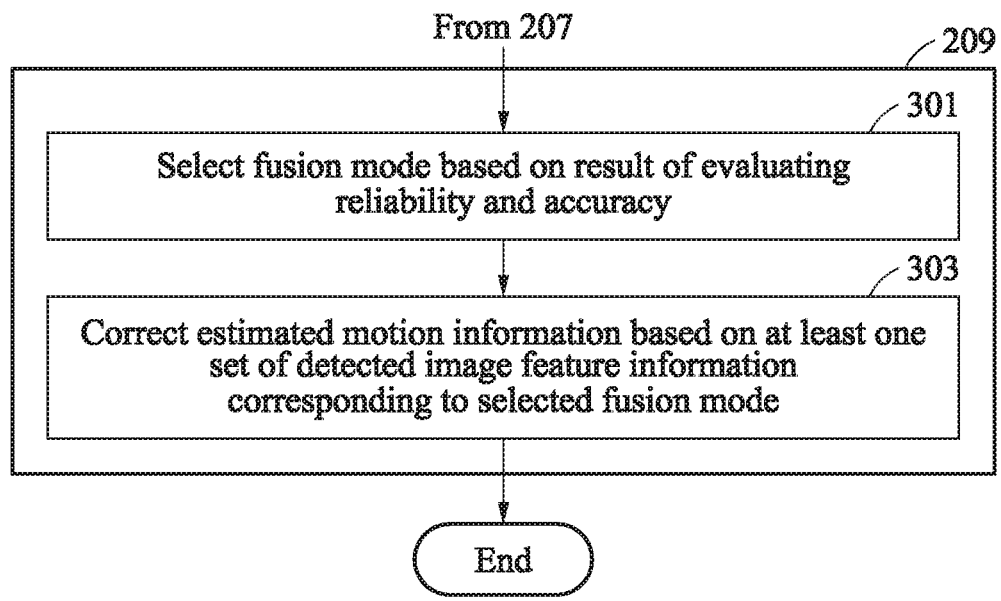
FIG. 3 illustrates an example of an operation of correcting.

FIG. 3 illustrates an example of an operation of correcting (e.g., the operation 209 of FIG. 2).

Referring to FIG. 3, in operation 301, the motion information estimating apparatus may select a fusion mode based on a result of evaluating a reliability and on an accuracy. The motion information estimating apparatus may select the fusion mode from a plurality of modes using at least one set of detected image feature information (e.g., the set of the detected image feature information selected in operation 209) and/or at least one set of initial motion information (e.g., the initial motion information estimated in operation 201). The motion information estimating apparatus may select the fusion mode from the modes based on a priority of each of the modes.

For example, when a priority of a fusion mode selected at a previous time is higher than a priority of a fusion mode to be selected at a current time, the motion information estimating apparatus may select a fusion mode for the current time after a certain time lag. Through this, a rapid mode switch from an upper mode to a lower mode may be performed, and it is thus a degradation of a precision may be prevented. In contrast, when a priority of the fusion mode selected at the previous time is lower than the priority of the fusion mode to be selected at the current time, a mode switch from the lower mode to the upper mode may be immediately performed, without delaying by the time lag, because there is no degradation of the precision.

In operation 303, the motion information estimating apparatus may correct estimated motion information based on at least one set of the detected image feature information corresponding to the selected fusion mode. The motion information estimating apparatus may combine all results of processing information from a GPS, an IMU, an OBD, and an image sensor, and calculate a current position. For example, the motion information estimating apparatus may combine different types of information using a nonlinear filter, for example, a multi-model Kalman filter, an extended Kalman filter, an unscented Kalman filter, a cubature Kalman filter, a particle filter, and the like.

Figure 4:
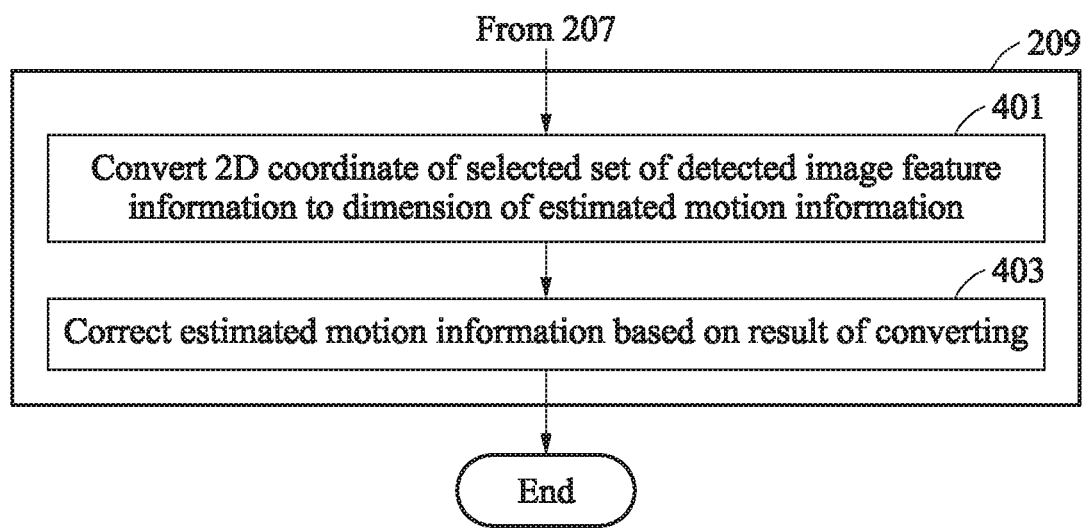
FIG. 4 illustrates an example of an operation of correcting.

FIG. 4 illustrates an example of an operation of correcting (e.g., the operation 209 of FIG. 2).

Referring to FIG. 4, in operation 401, the motion information estimating apparatus may convert a 2D coordinate of selected at least one set of detected image feature information to a dimension of estimated motion information. For example, the motion information estimating apparatus may convert information included in a selected mode from 2D to 3D.

In operation 403, the motion information estimating apparatus may correct the estimated motion information based on a result of the converting. Thus, the motion information estimating apparatus may obtain more accurate motion information by fusing sensor information of a GPS, an IMU, an OBD, and/or an image sensor. In an example, the operation 209 of FIG. 2 may include both the operations 301 and 303 of FIG. 3 and the operations 401 and 403 of FIG. 4.

Figure 5:
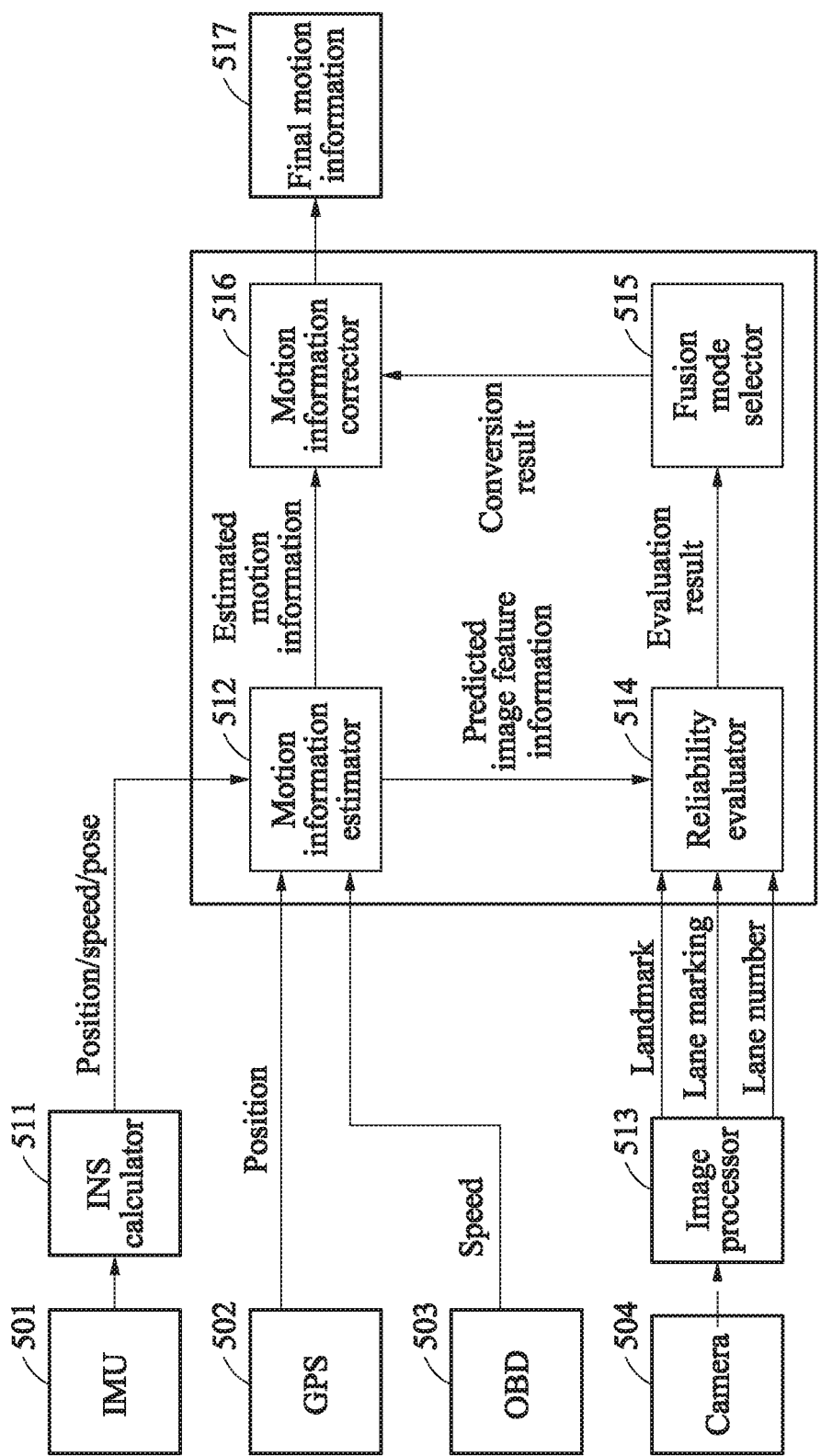
FIG. 5 illustrates an example of obtaining final motion information by a motion information estimating apparatus.

FIG. 5 illustrates an example of obtaining final motion information by a motion information estimating apparatus.

Referring to FIG. 5, sensor information of an IMU 501 may include angular speed information and acceleration information. An INS calculator 511 may calculate a position, a speed, and/or a pose of a vehicle based on the sensor information of the IMU 501. The INS calculator 511 may calculate the position, the speed, and/or the pose of the vehicle by integrating an angular speed and an acceleration. Sensor information of a GPS 502 may include position information of the vehicle. Sensor information of an OBD 503 may include speed information of the vehicle. In an example, any one or any combination of the position, the speed, and/or the pose calculated by the INS calculator 511, the position information included in the sensor information of the GPS 502, and/or the speed information included in the sensor information of the OBD 503 may correspond to any of the initial motion information discussed above with reference to FIGS. 1-4.

A motion information estimator 512 may estimate motion information based on initial motion information obtained from the IMU 501, the GPS 502, and the OBD 503. The motion information estimator 512 may estimate the motion information that is more accurate than the initial motion information by fusing such a plurality of sets of the initial motion information.

The motion information estimator 512 may convert a dimension of the estimated motion information to 2D (e.g., from 3D). The motion information estimator 512 may convert the dimension of the estimated motion information to a position of a 2D coordinate. The motion information estimator 512 may specify a position of the vehicle in 2D map information using the estimated motion information. For example, the motion information estimator 512 may convert a 3D coordinate of the estimated motion information to a 2D coordinate on a map. A result obtained therefrom (e.g., the 2D coordinate) may be referred to herein as predicted image feature information.

An image processor 513 may detect a plurality of sets of feature information from an image captured by a camera 504. For example, the image processor 513 may detect, from the image, a landmark, a lane marking, and/or a lane number.

A result of the detecting may be referred to herein as detected image feature information. The image processor 513 may include a pretrained neural network. An individual neural network may correspond to each type of feature information.

A reliability evaluator 514 may compare each of the sets of the detected image feature information and each of sets of the predicted image feature information. The reliability evaluator 514 may evaluate a reliability of each of the sets of the detected image feature information based on a result of the comparing. For example, when a detected position of a landmark is different from a predicted position of the landmark, the reliability evaluator 514 may calculate such a difference and compare the difference to a threshold value, to evaluate the reliability.

A fusion mode selector 515 may select feature information to be used for correction based on the reliability and an accuracy based on self-evaluation. The fusion mode selector 515 may exclude feature information with a relatively low accuracy, and select other remaining feature information. Here, for each type of feature information to be selected, a plurality of modes may be set in advance. Each of the modes may have a priority based on a precision that may be obtained from feature information to be included in a corresponding mode. The fusion mode selector 515 may select a mode that has a high priority while satisfying a standard of the reliability and the accuracy.

The motion information corrector 516 may correct the estimated motion information based on the feature information included in the selected mode. The motion information corrector 516 may convert a dimension of the feature information to a dimension of the estimated motion information. For example, the motion information corrector 516 may convert 2D feature information to a 3D coordinate.

The motion information corrector 516 may correct the estimated motion information based on a result of the converting. For example, the motion information corrector 516 may correct the estimated motion information using a Kalman filter. The motion information corrector 516 may output final motion information 517.

Figure 6:
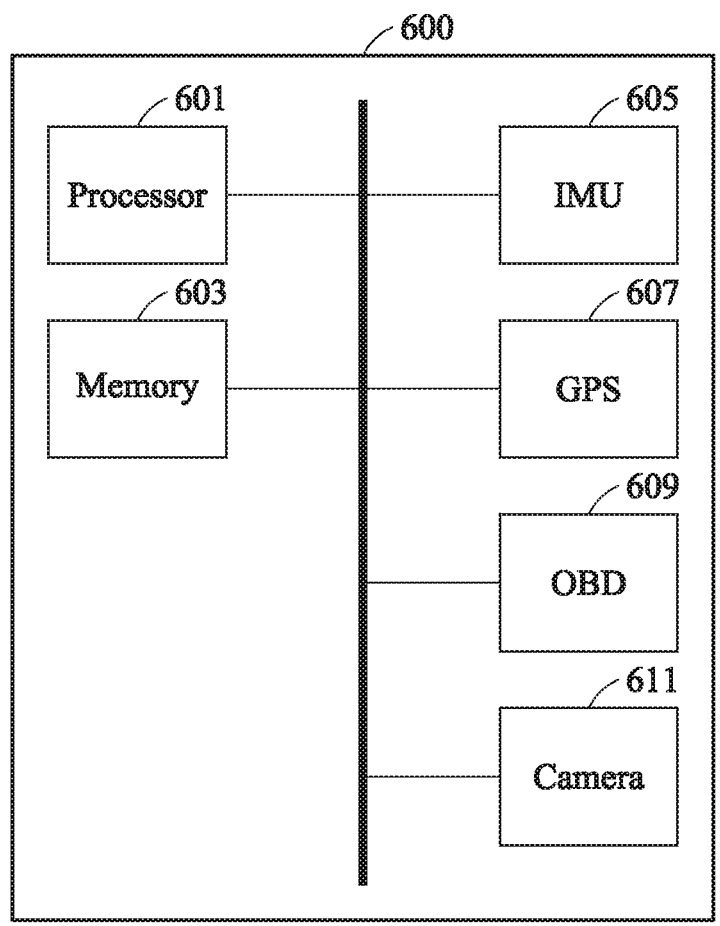
FIG. 6 illustrates an example of a motion information estimating apparatus.

FIG. 6 illustrates an example of a motion information estimating apparatus.

Referring to FIG. 6, a motion information estimating apparatus 600 includes at least one processor 601, a memory 603 configured to store therein a neural network, an image sensor (e.g., a camera, 611) configured to obtain an input image of a periphery of a vehicle, and at least one non-image sensor. For example, as illustrated, the non-image sensor includes an IMU 605, a GPS 607, and an OBD 609. However, examples are not limited to the foregoing example, and the non-image sensor may further include various sensors, for example, a radar sensor and a lidar sensor.

The non-image sensor may obtain at least one set of sensor information associated with a motion of the vehicle. For example, the processor 601 may calculate a position, a speed, and a pose of the vehicle from the IMU sensor 605. The processor 601 may obtain a position from the GPS sensor 607. The processor 601 may obtain a speed from a vehicle speedometer, for example, the OBD 609. The processor 601 may calculate at least one set of initial motion information of the vehicle based on the at least one set of the sensor information. The processor 601 may estimate motion information based on the at least one set of the initial motion information. The processor 601 may estimate the motion information by fusing sets of information obtained from such a plurality of sensors.

The processor 601 may predict a plurality of sets of image feature information associated with the periphery of the vehicle based on the estimated motion information. The processor 601 may predict the sets of the image feature information by converting the estimated motion information to a 2D coordinate on an image based on a FOV of the image sensor.

The processor 601 may obtain a plurality of sets of detected image feature information from the input image, and an accuracy of each of the sets of the detected image feature information, using the neural network. The processor 601 may evaluate a reliability of each of the sets of the detected image feature information by comparing each of the sets of the predicted image feature information and each of the sets of the detected image feature information. The processor 601 may correct the estimated motion information based on at least one set of the detected image feature information selected based on a result of evaluating the reliability and on the accuracy.

The processor 601 may evaluate the reliability based on a difference between the sets of the predicted image feature information and the sets of the detected image feature information. The processor 601 may perform mutual fault detection using different types of sensor data. For example, the reliability may be determined through residual-based mutual verification.

The processor 601 may select a fusion mode. The processor 601 may select the fusion mode based on the result of evaluating the reliability and the accuracy. The processor 601 may correct the estimated motion information based on at least one set of the detected image feature information that corresponds to the selected fusion mode. The processor 601 may select the fusion mode from a plurality of modes that uses at least one set of the detected image feature information or at least one set of the initial motion information.

The processor 601 may select the fusion mode from the modes based on a priority of each of the modes. Here, a priority may be set based on a precision that may be obtained by a combination of sets of feature information included in a corresponding mode. For example, a landmark may provide 6D information and a lane marking may provide 2D information, and thus a mode including the landmark may have a higher priority than a mode including the lane marking.

The processor 601 may apply a time lag when performing a mode switch. For example, when a priority of a fusion mode selected at a previous time is higher than a priority of a fusion mode to be selected at a current time, the processor 601 may select a fusion mode for the current time after a predetermined time lag. Thus, the processor 601 may switch a mode to a lower mode around a time when an advantage in terms of performance disappears as time elapses.

The processor 601 may convert a 2D coordinate of the selected at least one set of the detected image feature information to a dimension of the estimated motion information. The processor 601 may correct the estimated motion information based on a result of the converting.

The motion information estimating apparatus, and other apparatuses, devices, units, modules, devices, and other components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented motion information estimating method, comprising:

estimating motion information of a vehicle based on at least one set of initial motion information of the vehicle that is obtained from at least one non-image sensor;

predicting a plurality of sets of image feature information corresponding to a periphery of the vehicle based on the estimated motion information from the at least one non-image sensor;

obtaining a plurality of sets of detected image feature information detected from an input image obtained from an image sensor and an accuracy of each of the sets of the detected image feature information using a neural network;

evaluating a reliability of each of the sets of the detected image feature information, based on a difference between the sets of the predicted image feature information and the sets of the detected image feature information, by comparing the sets of the predicted image feature information from the at least one non-image sensor and the sets of the detected image feature information from the image sensor;

selecting at least one set of the sets of the detected image feature information based on a result of the evaluating of the reliability and on the accuracy; and correcting the estimated motion information of the vehicle based on the at least one set of the sets of the detected image feature information being selected, including selectively fusing the estimated motion information from the at least one non-image sensor and the plurality of sets of the detected image feature information obtained from the image sensor based on the result of the evaluating of the reliability and on the accuracy, wherein the evaluating a reliability further includes, when the evaluated reliability is less than or equal to a predetermined threshold value, determining that a malfunction occurs in an image processing process on at least one of the sets of the detected image feature information from the image sensor and/or excluding at least one of the sets of the detected image feature information from the correcting the estimated motion information of the vehicle.

2. The method of claim 1, wherein the correcting comprises:

selecting a fusion mode based on the result of the evaluating of the reliability and the accuracy; and correcting the estimated motion information based on at least one set of the detected image feature information corresponding to the selected fusion mode.

3. The method of claim 2, wherein the fusion mode comprises a predetermined number of axis position information and axis pose information to be derived from the at least one set of the detected feature information for the correcting of the estimated motion information.

4. The method of claim 2, wherein the selecting of the fusion mode comprises:

selecting the fusion mode from a plurality of modes that uses the at least one set of the detected image feature information or the at least one set of the initial motion information for the correcting of the estimated motion information.

5. The method of claim 4, wherein the selecting of the fusion mode comprises:

selecting the fusion mode from the modes based on a priority of each of the modes.

6. The method of claim 5, wherein the selecting of the fusion mode further comprises:

in response to a priority of a fusion mode selected at a previous time being higher than a priority of a fusion mode to be selected at a current time, selecting the fusion mode for the current time after a time lag.

7. The method of claim 1, wherein the comparing of the sets of the predicted image feature information and the sets of the detected image feature information comprises:
determining a difference between the sets of the predicted image feature information and the sets of the detected image feature information.

8. The method of claim 7, wherein the difference between the sets of the predicted image feature information and the sets of the detected image feature information comprises a difference between predicted object positions of the sets of the predicted image feature information and detected object positions of the sets of the detected image feature information.

9. The method of claim 1, wherein the predicting comprises:
predicting the sets of the image feature information by converting the estimated motion information to a two-dimensional (2D) coordinate on a 2D image based on a field of view (FOV) of the image sensor.

10. The method of claim 9, wherein the 2D image includes a 2D bird's-eye-view map image.

11. The method of claim 1, wherein the correcting comprises:
converting a 2D coordinate of the selected at least one set of the detected image feature information to a dimension of the estimated motion information; and
correcting the estimated motion information based on a result of the converting.

12. The method of claim 1, wherein the estimating comprises:
determining a position, a speed, and a pose of the vehicle based on information received from an inertial measurement unit (IMU) sensor;
obtaining a position from a global positioning system (GPS) sensor;
obtaining a speed from a vehicle speedometer; and
estimating the motion information by fusing sets of information obtained from the IMU sensor, the GPS sensor, and the vehicle speedometer.

13. The method of claim 12, wherein the at least one set of the initial motion information comprises any one of: the determined position, speed, and pose of the vehicle; the obtained position; and the obtained speed.

14. The method of claim 1, further comprising:
determining whether to perform the motion information estimating method based on a speed obtained from a vehicle speedometer included in the initial motion information.

15. A non-transitory computer-readable storage medium storing instructions that, when executed by one or more processors, configure the one or more processors to perform the method of claim 1.

16. A motion information estimating apparatus comprising:
an image sensor configured to obtain an input image of a periphery of a vehicle;
at least one non-image sensor configured to obtain at least one set of sensor information of a motion of the vehicle; and
one or more processors configured to:
determine at least one set of initial motion information of the vehicle based on the at least one set of the sensor information measured from the at least one non-image sensor;
estimate motion information of the vehicle based on the determined at least one set of the initial motion information determined from the at least one non-image sensor;
predict a plurality of sets of image feature information corresponding to the periphery of the vehicle based on the estimated motion information from the at least one non-image sensor;
obtain a plurality of sets of detected image feature information detected from the input image from the image sensor and an accuracy of each of the sets of the detected image feature information, using a neural network;
evaluate a reliability of each of the sets of the detected image feature information by comparing the sets of the predicted image feature information from the at least one non-image sensor and the sets of the detected image feature information from the image sensor;
select at least one set of the sets of the detected image feature information based on a result of the evaluating of the reliability and on the accuracy; and
correct the estimated motion information of the vehicle based on at least one set of the sets of the detected image feature information being selected, including selectively fusing sensed information obtained from the at least one non-image sensor and sensed information obtained from the image sensor based on the result of the evaluating of the reliability and on the accuracy,
wherein the evaluating a reliability further includes, when the evaluated reliability is less than or equal to a predetermined threshold value, determining that a malfunction occurs in an image processing process on at least one of the sets of the detected image feature information from the image sensor and/or excluding at least one of the sets of the detected image feature information from the correcting the estimated motion information of the vehicle.

17. The apparatus of claim 16, wherein, for the correcting, the one or more processors are configured to:
select a fusion mode based on the result of the evaluating of the reliability and the accuracy; and
correct the estimated motion information based on at least one set of the detected image feature information corresponding to the selected fusion mode.

18. The apparatus of claim 17, wherein, for the selecting of the fusion mode, the one or more processors are configured to:
select the fusion mode from a plurality of modes that uses the at least one set of the detected image feature information or the at least one set of the initial motion information for the correcting of the estimated motion information.

19. The apparatus of claim 18, wherein, for the selecting of the fusion mode, the one or more processors are configured to:
select the fusion mode from the modes based on a priority of each of the modes.

20. The apparatus of claim 19, wherein, for the selecting of the fusion mode, the one or more processors are configured to:
in response to a priority of a fusion mode selected at a previous time being higher than a priority of a fusion mode to be selected at a current time, select the fusion mode for the current time after a time lag.

21. The apparatus of claim 16, wherein, for the comparing of the sets of the predicted image feature information and the sets of the detected image feature information, the one or more processors are configured to:
  determine a difference between the sets of the predicted image feature information and the sets of the detected image feature information.

22. The apparatus of claim 16, wherein, for the predicting, the one or more processors are configured to:
  predict the sets of the image feature information by converting the estimated motion information to a two-dimensional (2D) coordinate on a 2D image based on a field of view (FOV) of the image sensor.

23. The apparatus of claim 16, wherein, for the correcting, the one or more processors are configured to:
  convert a 2D coordinate of the selected at least one set of the detected image feature information to a dimension of the estimated motion information; and
  correct the estimated motion information based on a result of the converting.

24. The apparatus of claim 16, wherein, for the estimating, the one or more processors are configured to:
  determine a position, a speed, and a pose of the vehicle based on information received from an inertial measurement unit (IMU) sensor;
  obtain a position from a global positioning system (GPS) sensor;
  obtain a speed from a vehicle speedometer; and
  estimate the motion information by fusing sets of information obtained from the IMU sensor, the GPS sensor, and the vehicle speedometer.

25. The apparatus of claim 16, further comprising a memory storing instructions that, when executed by the one or more processors, configure the one or more processors to perform the estimating of the motion information, the predicting of the sets of the image feature information, the determining of the sets of detected image feature information, the evaluating of the reliability of each of the sets of the detected image feature information, and the correcting of the estimated motion information.

26. A processor-implemented motion information estimating method, comprising:
  estimating motion information of a vehicle based on information received from at least one non-image sensor;
  predicting image feature information corresponding to a periphery of the vehicle based on the estimated motion information from the at least one non-image sensor;
  detecting, using a neural network, a plurality of sets of image feature information based on an input image obtained from at least one image sensor;
  determining a reliability of each of the sets of the detected image feature information by comparing the predicted image feature information from the at least one non-image sensor with the detected image feature information from the at least one image sensor;
  selecting at least one set of the sets of the detected image feature information based on a result of the evaluating of the reliability and on the accuracy; and
  correcting the estimated motion information of the vehicle based on the at least one set of the sets of detected image feature information being selected in response to the determined reliability being greater than or equal to a threshold, including selectively fusing the estimated motion information from the at least one non-image sensor and the plurality of sets of the detected image feature information obtained from the image sensor based on the result of the evaluating of the reliability and on the accuracy,
  wherein the evaluating a reliability further includes, when the evaluated reliability is less than or equal to a predetermined threshold value, determining that a malfunction occurs in an image processing process on at least one of the sets of the detected image feature information from the image sensor and/or excluding at least one of the sets of the detected image feature information from the correcting the estimated motion information of the vehicle.

* * * * *